United States Patent [19]

Oota et al.

[11] Patent Number: 5,054,450
[45] Date of Patent: Oct. 8, 1991

[54] CONTROL SYSTEM FOR AN AUTOMOBILE ENGINE WITH AUTOMATIC TRANSMISSION

[75] Inventors: Yuji Oota, Higashihiroshima; Katsuhiro Momii, Hiroshima; Kenji Okamoto, Higashihiroshima, all of Japan

[73] Assignee: Mazda Motor Corporation, Hiroshima, Japan

[21] Appl. No.: 522,954

[22] Filed: May 14, 1990

[30] Foreign Application Priority Data

May 12, 1989 [JP] Japan ................................ 1-119047

[51] Int. Cl.$^5$ .......................................... F02D 41/08
[52] U.S. Cl. .................................. 123/478; 123/339; 74/873
[58] Field of Search ............... 123/325, 339, 478, 492, 123/493, 480; 74/844, 859, 860, 873

[56] References Cited

U.S. PATENT DOCUMENTS

| | | | |
|---|---|---|---|
| 4,750,386 | 6/1988 | Bowers et al. | 123/478 X |
| 4,825,829 | 5/1989 | Abe | 123/339 |
| 4,838,223 | 6/1989 | Tanabe et al. | 123/339 |
| 4,841,447 | 6/1989 | Hayashi et al. | 123/339 X |
| 4,870,933 | 10/1989 | Mizuno | 123/325 |
| 4,883,034 | 11/1989 | Yashiki et al. | 123/339 |
| 4,903,660 | 2/1990 | Sogawa | 123/478 X |
| 4,914,982 | 4/1990 | Ito et al. | 74/844 |

Primary Examiner—Willis R. Wolfe
Attorney, Agent, or Firm—Fleit, Jacobson, Cohn, Price, Holman & Stern

[57] ABSTRACT

An internal combustion engine which has an automatic transmission and an intake air control system for causing an increased quantity of intake air to be introduced into the internal combustion engine when the automatic transmission shifts from its neutral range to its drive range, is controlled by a control system that includes fuel increasing apparatus and a fuel injection control apparatus. The fuel increasing apparatus causes an increased quantity of fuel to be introduced into the internal combustion engine according to the increased quantity of intake air, and the fuel injection control apparatus causes fuel injection at the increased quantity of fuel to begin at a timing prior to increasing the quantity of intake air when the automatic transmission shifts from the neutral range to the drive range. This prevents the air to fuel ratio from becoming lean and slowing down the engine after the shift.

8 Claims, 7 Drawing Sheets

CONTROL SYSTEM FOR AN AUTOMOBILE ENGINE WITH AUTOMATIC TRANSMISSION

FIELD OF THE INVENTION

The present invention relates to an automobile engine control system and, more particularly to a control system for an automobile engine with an automatic transmission in which the engine speed is controlled by increasing the quantity of intake air flowing into the engine when the automatic transmission shifts from its neutral range to its drive range.

BACKGROUND OF THE INVENTION

Heretofore, there has been proposed an engine control device for an internal combustion engine with an automatic transmission which is adapted to prevent the engine speed from decreasing by increasing intake air through control of an idle speed control valve, causing the valve to open when load is applied to the engine due to a shift of the automatic transmission from its neutral range to its drive range. Such an engine control device is known from, for example, Japanese Unexamined Patent Published No. 61(1986)-279751.

In the engine control device described in the above publication, fuel is increased depending upon an compensatory increase of intake air caused by the idle speed control valve and detected by an airflow meter. However, it has a problem in that the air to fuel ratio of the fuel mixture tends to become lean and that, accordingly, a drop in engine speed cannot be prevented effectively. This results from the late detection of an increase in intake air quantity caused due to a volumetric capacity between the engine and airflow meter which attributes to the delay of supplying fuel.

SUMMARY OF THE INVENTION

It is, therefore, a primary object of the present invention to provide an engine control system for an internal combustion engine with an automatic transmission that can prevent with reliability, the drop of engine speed due to a lean fuel mixture caused by a delay in increasing the fuel supply responding to an increase of intake air when the automatic transmission shifts from its neutral range to its drive range.

The present invention, in order to achieve the above object, provides an engine control system for an internal combustion engine which has an automatic transmission and which is in cooperation with intake air control means for causing an increase of intake air to be introduced into the internal combustion engine when the automatic transmission shifts from its neutral range to its drive range.

The engine control system includes fuel increasing means for causing an increase in the quantity of fuel to be introduced into the internal combustion engine according to the increase of intake air, and fuel injection control means for causing fuel injection with the increase in quantity of fuel to begin prior to the increase of intake air, when the automatic transmission shifts from its neutral range to its drive range.

DESCRIPTION OF THE PREFERRED EMBODIMENT

Figure 1:
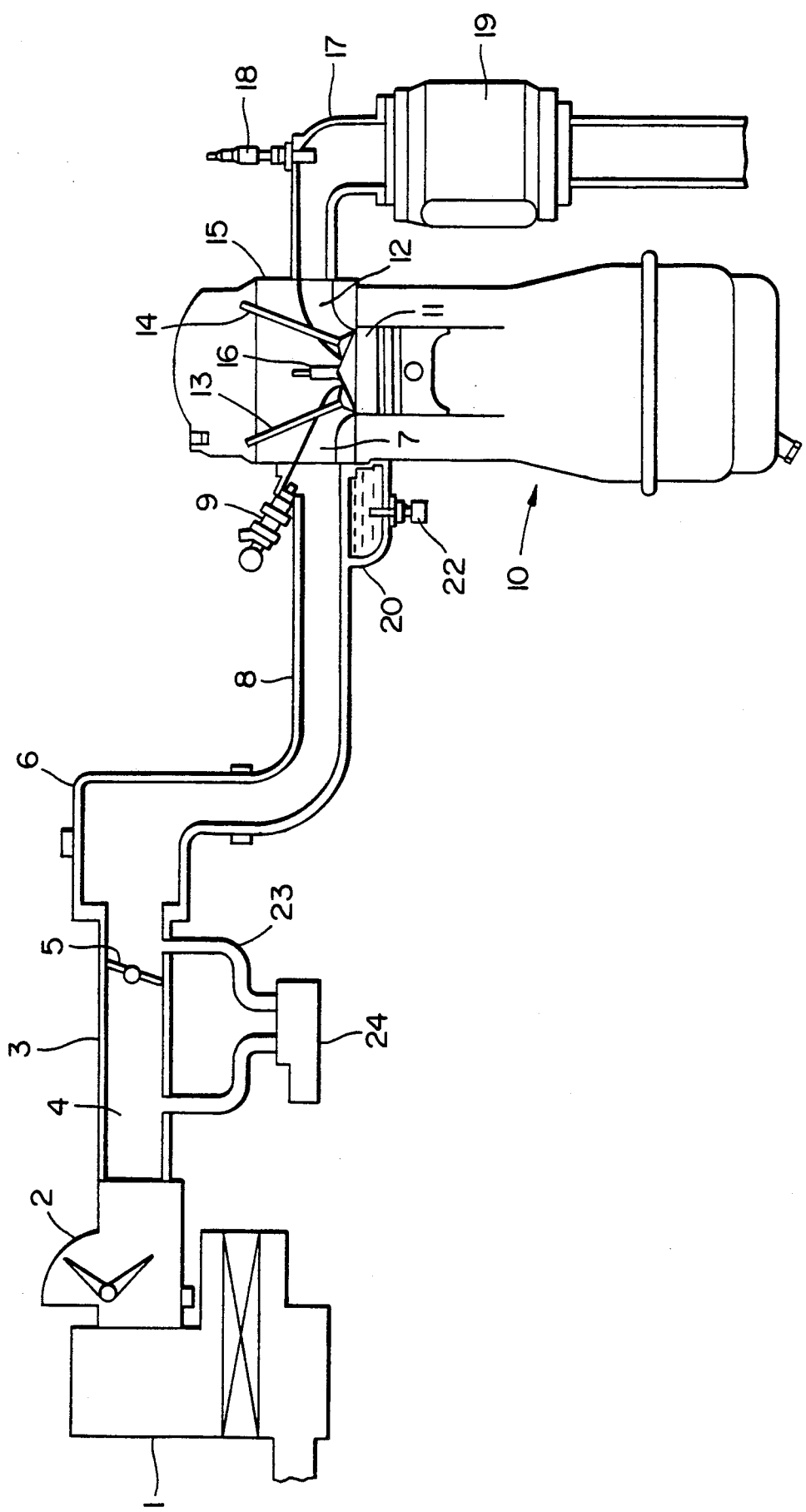
FIG. 1 is a schematic illustration of an engine control system in accordance with a preferred embodiment of the present invention.

Referring to the drawings in detail, in particular to FIG. 1, a control system for an automobile internal combustion engine with an automatic transmission is shown. The control system includes an airflow meter 2 disposed after an air cleaner 1 for purifying intake air. With this airflow meter 2 the flow rate or quantity of intake air introduced through the air cleaner 1 is detected as a voltage change.

Connected to the air cleaner 1 after the airflow meter 2 is a throttle body 3 for forming a throttle chamber 4 in which a throttle valve 5 is disposed. As is well known in the art, the throttle valve 5 serves as a control valve for increasingly or decreasingly changing the quantity of intake air passing therethrough. Also, connected to an intake pipe after the throttle valve 5 is a surge tank 6 which is formed as a fixed volumetric capacity enlarged chamber. The surge tank 6 is connected to an intake manifold 8 in communication with each of the intake ports 7 of an internal combustion engine (which is hereinafter referred simply to as an engine) 10 having an automatic transmission (not shown) which may be of any type well known in the art. The intake manifold 8 is provided with a fuel injection valve 9 adjacent to the intake port 7.

The engine 10, with its intake port 7 and exhaust port 12 opening into a combustion chamber 11 of the engine 10, is installed with intake and exhaust valves 13 and 14 which are driven by a valve driving mechanism or structure (not shown) to open and close the intake and exhaust ports 7 and 12 at approximate times. A cylinder head 15 of the engine 10 has an ignition plug 16 with a spark gap bordering the combustion chamber 11.

The exhaust manifold 17, connected to the exhaust port 12, is equipped with an exhaust gas or oxygen sensor 18 and a catalytic converter 19 for significantly lowering emission levels of hydrocarbons, carbon monoxide, and in the case of some converters, oxides of nitrogen in the exhaust from the engine 10.

The intake manifold 8 is formed with a water jacket 20 surrounding the engine 10. Installed within the water jacket 20 is an engine coolant temperature sensor 22 adapted to monitor the temperature of engine coolant, for example water, as a substitute for the temperature of transmission oil used in the automatic transmission.

In association with the throttle body 3 a bypass path 23 with an idle speed control valve (which is hereinafter referred simply to as an ISC valve) 24 is provided to allow intake air to flow partly bypassing the throttle valve 5. The ISC valve 24 serves to control the speed of the engine in idling.

Figure 2:
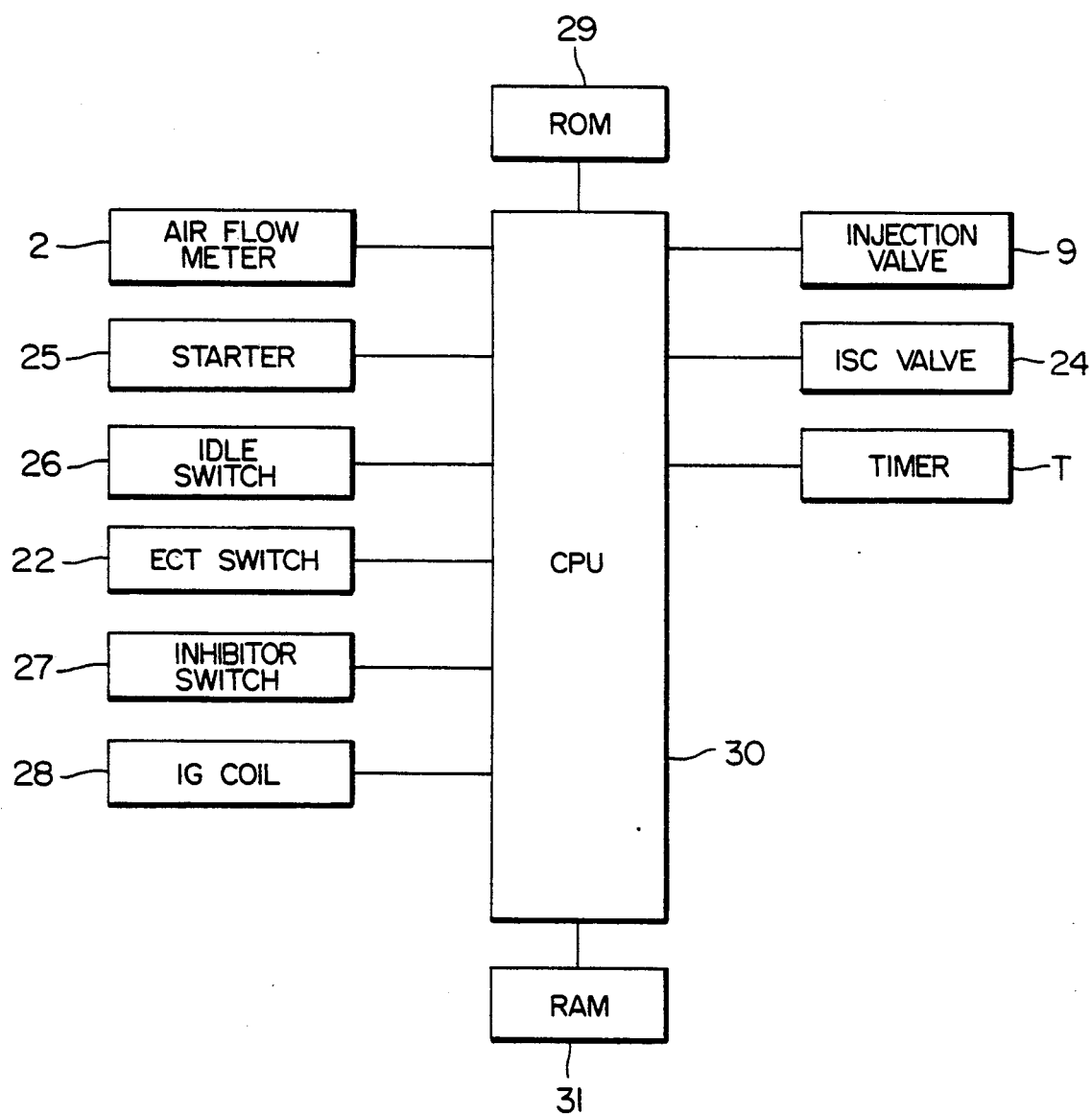
FIG. 2 is a block diagram of a control unit for the engine control system shown in FIG. 1.

Referring to FIG. 2 showing the engine control system, in block diagram, in cooperation with the engine 10, CPU 30, which mainly comprises a microcomputer, receives various signals provided from a starter 25, an idle switch 26, an inhibitor switch 27 for detecting shift ranges of the automatic transmission, and an ignition coil 28, as well as from the airflow meter 2 and engine coolant temperature sensor 22. The CPU 30, based on the signals and following a program stored in ROM 29, controls operations of the fuel injection valve 9, ISC valve 24, countdown timer T for the determining the timing at which the increase of fuel is to be conducted. On the other hand, RAM 31 is essential for storing therein data and graphs or maps shown in FIGS. 3-6, for example idle speed control value map (FIG. 3) for load compensation, fuel increase value map (FIG. 4), fuel decrease value map (FIG. 5) and time map (FIG. 6) for giving times t1 and t2 for determining timings at which the fuel and intake air quantities are increased, respectively, as well as data of, for example, engine speed used for judging the starting of the engine 10, target idle speed and delay time for idle speed control.

It is noted here that the CPU 30 has functions of increasingly changing the rate or quantity of intake air by a fixed rate at the moment the automatic transmission shifts from its neutral range to drive range, increasing the quantity of fuel according to the increased quantity of intake air, and of putting into action the controlling of the fuel quantity increase prior to proceeding with controlling of the intake air quantity increase.

Figure 3:
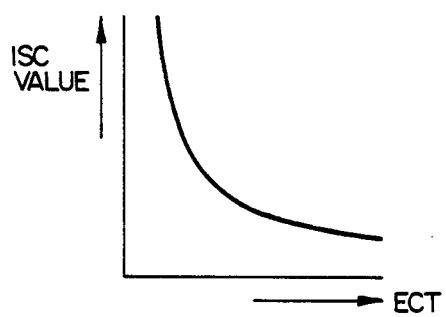
FIG. 3 is a graph showing the idle speed control load compensation value relative to the temperature of an engine coolant.
Figure 4:
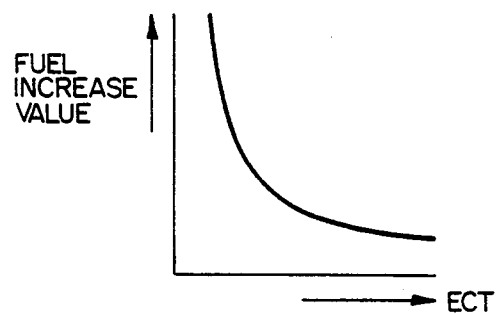
FIG. 4 is a graph showing an increasing value of fuel relative to the temperature of engine coolant.
Figure 5:
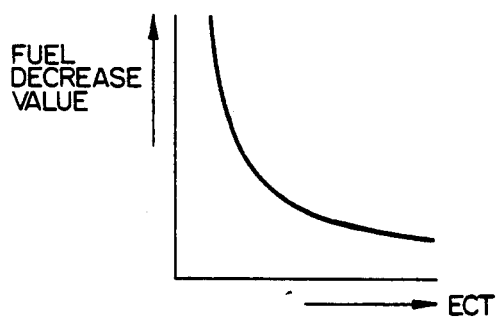
FIG. 5 is a graph showing a decreasing value of fuel relative to the temperature of engine coolant.
Figure 6:
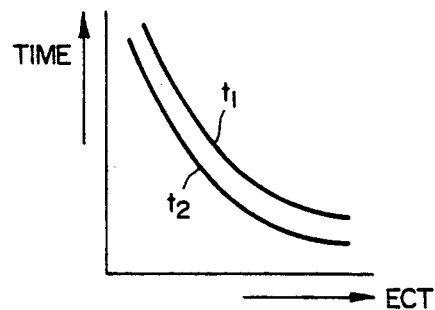
FIG. 6 is a graph showing a follow up time value relative to the temperature of engine coolant.

The map illustrated in FIG. 3 shows that idle speed control (ISC) value should be increased for load compensation when the temperature of engine coolant becomes lower since fuel combustibility worsens as the temperature of engine coolant becomes lower. The map illustrated in FIG. 4 shows that an increase in fuel is changed when the temperature of engine coolant becomes lower since fuel combustibility worsens as the temperature of engine coolant becomes lower. The map illustrated in FIG. 5 shows that a time for compensation is always fixed by boosting the fuel decrease value in dealing with the initial fuel increase value, and the map in FIG. 6 shows that the time difference between timings at which the fuel increase control and intake air increase control are conducted is prolonged as the temperature of engine coolant or transmission oil becomes lower since, as the temperature of engine coolant substituting the temperature of transmission oil becomes lower, a timing at which the shifting of the automatic transmission from the neutral range to the drive range actually caused is delayed on the account of the viscosity of transmission oil.

Figure 8:
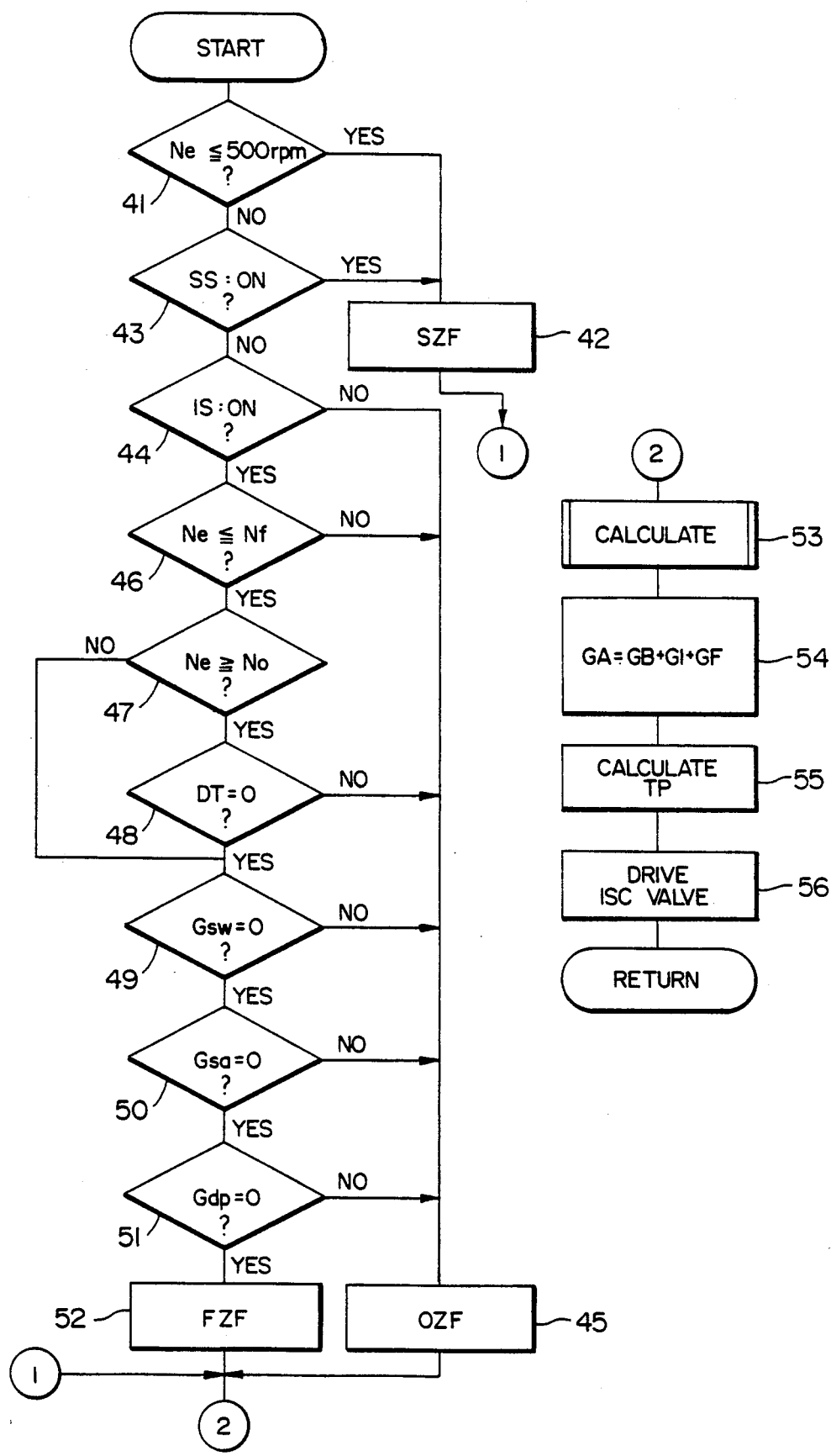
FIG. 8 is a flow chart illustrating the idle speed control main routine.
Figure 9:
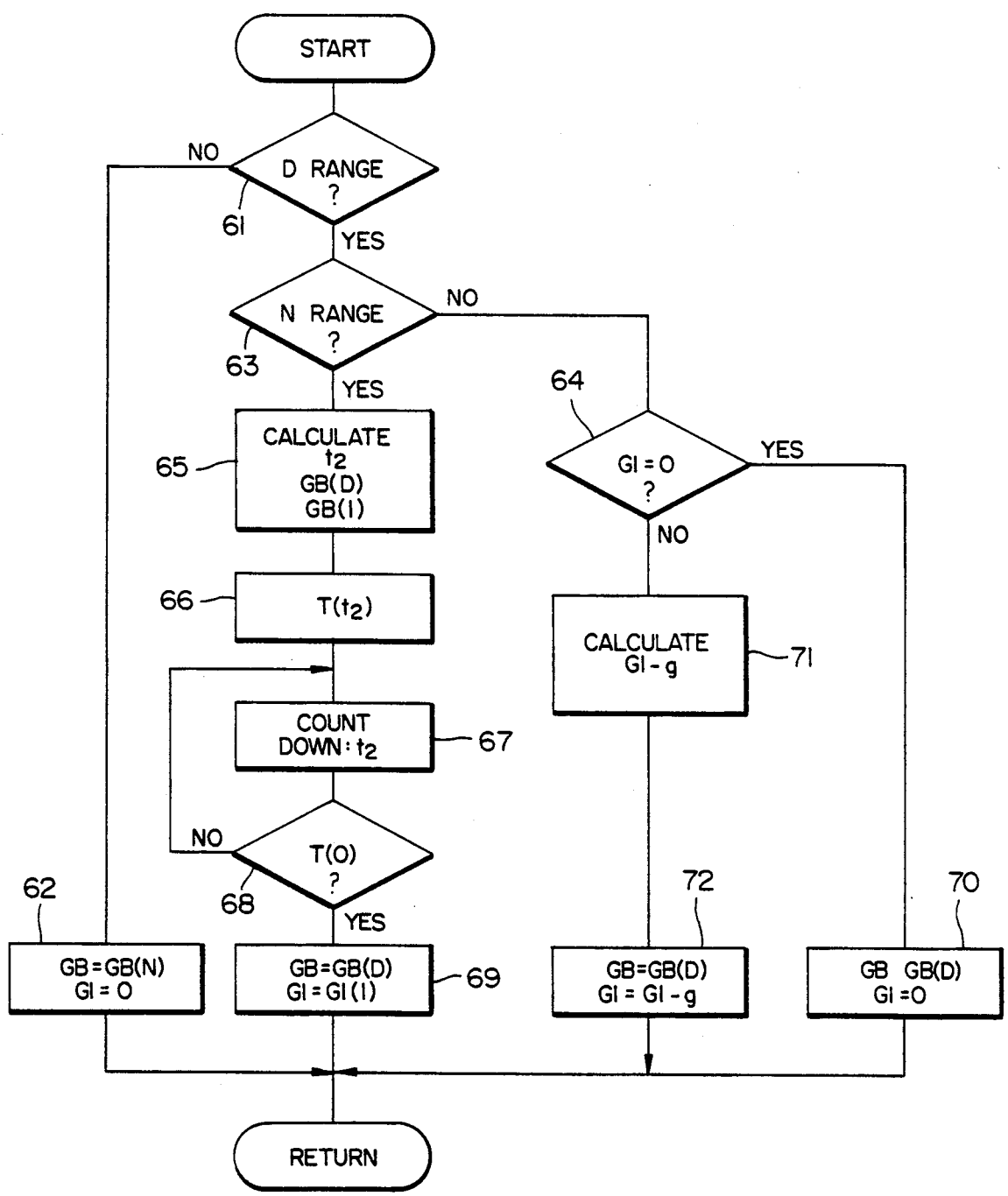
FIG. 9 is a flow chart illustrating a load compensating value calculation subroutine.
Figure 10:
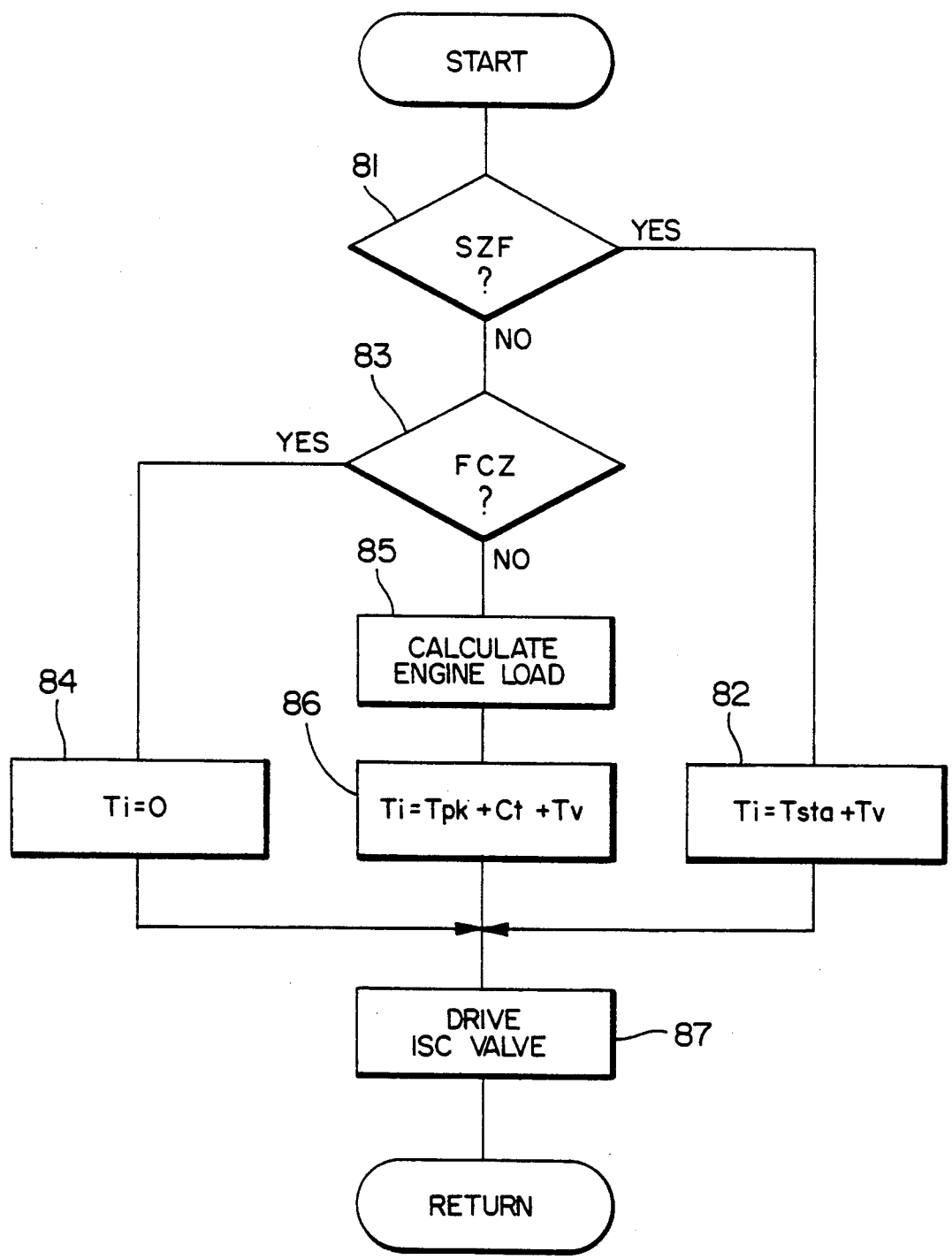
FIG. 10 is a flow chart illustrating a fuel control routine.

The operation of the engine control system illustrated in FIGS. 1 and 2 will be best understood by reviewing FIGS. 8 to 10, which are flow charts illustrating various routines for the microcomputer of the CPU 30. Programming a microcomputer is a skill well understood in the art. The following description is written to enable a programmer having ordinary skill in the art to prepare an appropriate program for the microcomputer. The particular details of any such program would of course depend upon the architecture of the particular microcomputer selected.

Referring to FIG. 8, which is a flow chart illustrating the idle speed control main routine, in first step 41, the CPU 30 compares the speed of engine (Ne) represented by the signal from the ignition coil 28 to 500 rpm. which is a critical speed presumably established for judging the starting of the engine. If the engine speed (Ne) is equal to or lower than 500 rpm., the CPU 30 switches to step 42 to conduct a start zone fuel (SZF) control. On the other hand, when the engine speed (Ne) is higher than 500 rpm., CPU 30 switches to step 43.

At step 43, the CPU 30 decides on the state, ON or OFF, of the starter switch (SS) 25. CPU 30 switches to step 42 if the starter switch (SS) 25 is ON or to step 44 if the starter switch (SS) 25 is OFF although the engine 10 has started. At step 44, the CPU 30 decides on the state, On or OFF, of the idle switch (IS) 26. If the idle switch (IS) 26 is OFF during normal driving, CPU 30 switches to step 45 to conduct an open zone fuel (OZF) control. On the other hand, if the idle switch (IS) 26 is ON, CPU 30 switches to step 46. There, CPU 30 retrieves data of a fixed speed (Nf) depending upon coolant temperature from a map to compare it to the speed of engine (Ne). If the speed of engine (Ne) is equal or lower than the fixed speed (Nf), CPU 30 switches to step 47. The fixed speed (Nf) is preset to, for example, 850 rpm. in idling after normal driving or 1500 rpm. in idling before driving.

At step 47, the CPU 30 compares the engine speed (Ne) to the target idle speed (No). If the engine speed (Ne) is equal or higher than the target idle speed (No), then, CPU 30 switches to step 48. At step 48, CPU 30 judges the presence of delay time (DT) for idle speed feedback control: when the delay time (DT) is zero (0), then it switches to step 49. However, if the engine speed (Ne) is judged to be lower than the target idle speed (No) in step 49, then CPU 30 jumps to step 49.

At step 47, CPU 30 judges the presence of coolant temperature-depending compensation (Gsw) upon engine starting. If no coolant temperature-depending compensation (Gsw=0) has been conducted, then it switches to step 50. At this step 50, CPU 30 judges the presence of intake air temperature-depending compensation (Gsa) upon engine starting. If no intake air temperature-depending compensation (Gsa=0) has been conducted, then it switches to step 51. There, CPU 30 judges the presence of dash pot-depending compensation (Gdp). If no dash pot-depending compensation (Gdp=0) has been conducted, then it switches to step 52 to proceed into action a decision on idle speed feed back zone fuel (FZF) control.

At step 53, CPU 30 calls for the compensation value calculation subroutine illustrated in FIG. 9 to be described in detail later. Briefly stated, calculated in the subroutine is a basic air momentum (GB) for the neutral range, a basic air momentum (GB) for the drive range, a one-shot compensation air momentum (G1) when the automatic transmission is shifted from the neutral range to drive range. Thereafter, at step 54, CPU 30 calculates the total air momentum (GA) by adding various compensation values, such as the basic air momentum (GB), the one-shot compensation air momentum (G1) and the momentum (GF) of idle speed feedback zone fuel control.

Next, at step 55, CPU 30 calculates a time period (TP) for which the ISC valve 24 should be maintained ON or open based on the total air momentum (GA) resulting from the calculation at step 54.

Finally, at step 56, CPU 30 drives the ISC valve 24 for the time period (TP) calculated at step 55.

Figure 7:
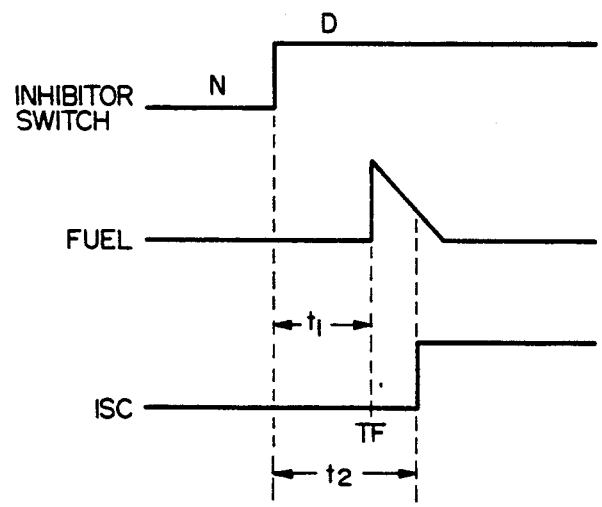
FIG. 7 is a fuel injection control timing chart.

It is noted that the timing at which the ISC valve 24 is put into action is set at the duration of time (t2) of the timer T as is shown in FIG. 7 in the compensation value calculation subroutine illustrated in FIG. 9. That is, at first step 61 in the compensation value calculation subroutine, CPU 30, based on the signal from the inhibitor switch 27, decides on the present range of the automatic transmission, i.e. drive (D) or neutral (N). CPU 30 switches to step 62 if deciding neutral (N) or to step 63 if deciding drive (D).

In step 62, the CPU 30 changes the basic air momentum (GB) to a value GB(N) for the neutral range, while setting the one-shot compensating air momentum (G1) to zero. On the other hand, during step 63, CPU 30 decides the last range of the automatic transmission, i.e. neutral (N) or drive (D), and switches to step 64 when the automatic transmission has been in the drive (D) range or to step 65 when deciding that the automatic transmission has shifted over to the drive (D) range from the neutral range in the last stage.

In step 65, the CPU 30, based on the temperature of engine coolant (ECT) represented by the signal from the engine coolant temperature sensor 22, retrieves a time, t2, which is used to determine the timing at which the automatic transmission is actually loaded when shifted into the drive range, from the map shown in FIG. 6, and calculates the basic air momentum GB(D) for the drive range and an initial value G1(I) of the one-shot compensation air momentum (G1). Thereafter, at step 66, CPU (30) sets the time T to the time, t2, retrieved from the map shown in FIG. 6 according to the engine coolant temperature (ECT). At step 67 the CPU 30 causes the timer T to countdown its set time, t2.

CPU 30, according to the decision of the termination of counting down of the time, t2, by the timer T at step 68, either returns to step 67 if the time, t2, has not been counted up or to step 69 if counted up. During this step 69, the CPU 30 sets the basic air momentum (GB) to a value GB(D) for the drive range and the one-shot compensation air momentum (G1) to the initial value G1(I) calculated at step 65.

At step 64, a decision is made whether the one-shot compensating air momentum (G1) has been set to zero (0). CPU 30 switches to step 70 to set the one-shot compensation air momentum (G1) to zero and the basic air momentum (GB) to a value GB(D) for the drive range if the one-shot compensation air momentum (G1) is zero (0). On the other hand, CPU 30 switches to step 71, if the one-shot compensation air momentum (G1) is not zero, to step 71 to proceed with a process of decreasing the last one-shot compensation air momentum (G1) by a value g determined according to the engine coolant temperature (ECT). Thereafter, during step 72, CPU 30 sets the basic air momentum (GB) to the value GB(D) for the drive range and also the one-shot compensation air momentum (G1) to the value (G1−g) calculated at step 71.

In this way the respective compensating values calculated during the subroutine illustrated in FIG. 9, namely the basic air momentum (GB) and the one-shot compensating air momentum (G1), are reflected in the idle speed control main routine illustrated in FIG. 8 to drive the ISC valve 24.

In the fuel control routine illustrated in FIG. 10, at first step 81, CPU 30 decides whether the engine operating condition is in the start fuel control zone (SZF). If deciding the engine operating condition is in the start fuel control zone, CPU 30 switches to step 82 to calculate a fuel injection time (Ti) by adding an ineffective injection time (Tv) and a starting injection time (Tsta) together. On the other hand, CPU 30, if deciding the engine operating condition is out of the start zone, switches to step 83.

In step 83, CPU 30 makes a decision whether the engine operating condition reaches a fuel cut zone (FCZ). If the engine operating condition is in the fuel cut zone, CPU 30 switches to step 84 to set the fuel injection time (Ti) to zero (0) for fuel cutting.

However, if the engine operating condition is out of the fuel cut zone during step 83, this indicates that the engine operating condition is neither in the start zone nor in the fuel cut zone, CPU 30 switches to step 85 to calculate the engine load based on the signal from the airflow meter 2.

In step 86, the CPU 30 calculates the fuel injection time (Ti) by adding a load-depending fuel injection time (Tpk), a total compensation time (Ct) and the ineffective fuel injection time (Tv) all together. It is noted here that the total compensation time (Ct) is determined as a total value of a fuel increase compensation value (Cdr) at the moment the automatic transmission shifts from the neutral range to the drive range, which value is calculated in the routine illustrated by the flow chart of FIG. 11 which is a parallel processing relative to the routine illustrated by the flow chart of FIG. 10, a feedback compensation value (Cfb), a learning compensation value (Clrn), a high load-depending increasing compensating value (Cer), an intake air temperature-depending compensating value (Cair), and an atmospheric pressure-depending compensating value (Cbar).

Finally, at step 87, CPU 30 drives the fuel injection valve 9 for the fuel injection time (Ti) determined at step 82, 84 or 86. Here, the driving of the fuel injection valve 9 in the case that the automatic transmission is shifted from the neutral range to the drive range is performed in the sequence shown in the flow chart in FIG. 11 prior to the intake air increasing control.

Figure 11:
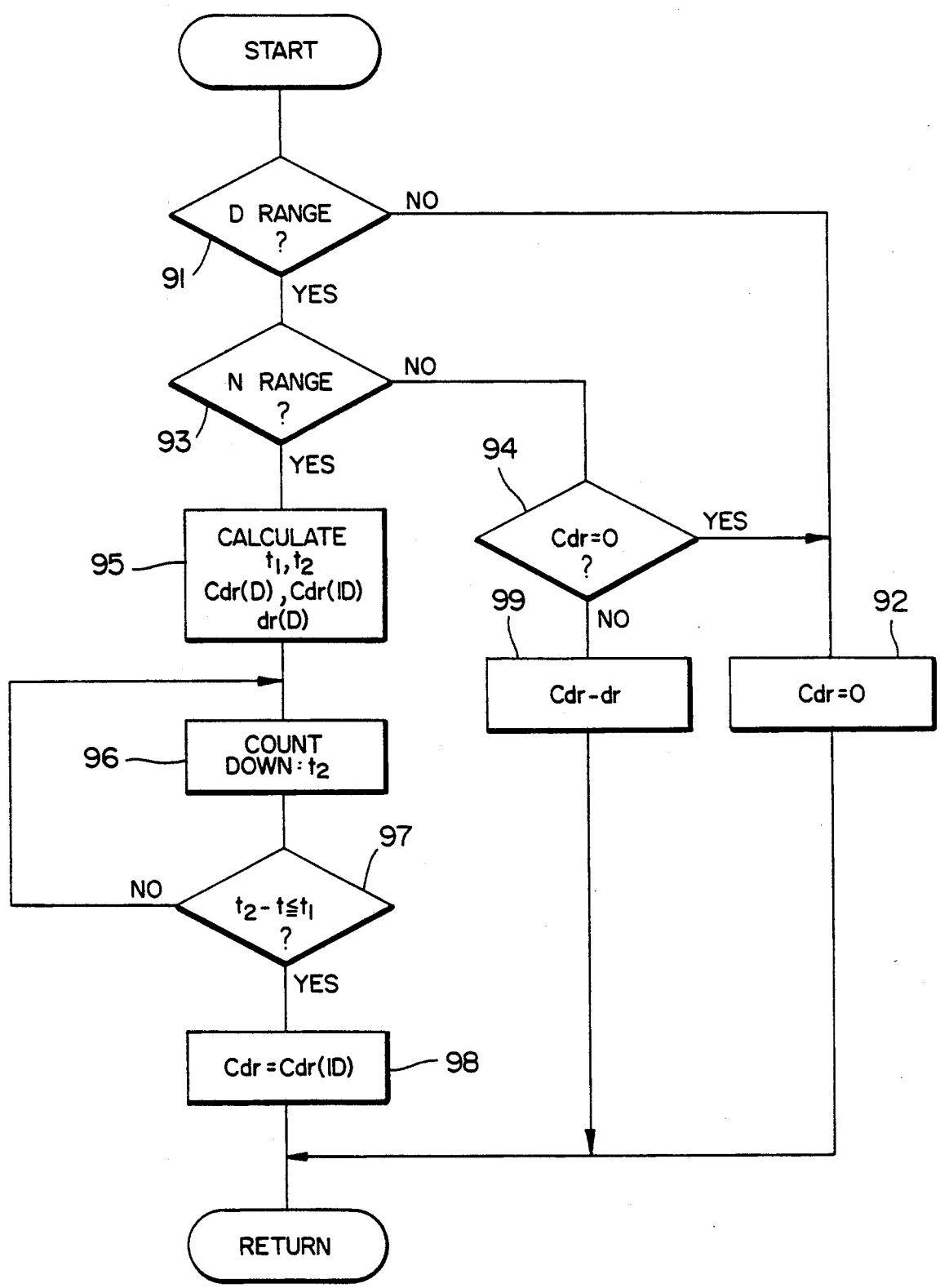
FIG. 11 is a flow chart illustrating the increasing value calculation routine.

In the routine for calculating the fuel increase compensation value (Cdr) shown in FIG. 11, the first step 91 is to make a decision based on the signal from the inhibitor switch 27 whether the automatic transmission is currently shifted to the drive (D) range. If the answer to the decision is no, CPU 30 switches to step 92 to set the fuel increase compensation value (Cdr) to zero (0). On the other hand, if the automatic transmission has been currently shifted to the drive (D) range, step 93 is taken to judge whether the last shift position of the automatic transmission is the neutral (N) range. If CPU 30 judges that the automatic transmission has been in the drive (D) range and is still maintained therein, it switches to step 94. In step 94, CPU 30 judges if the fuel increase compensation value (Cdr) has been set to zero (0). If the CPU 30 judges that the fuel increase compensating value (Cdr) has not been set to zero (0), in other words, that the automatic transmission is maintained in the drive (D) range during the last and current judgments, then it switches to step 99 in order to subtract the previous fuel increase compensation value (Gdr) by a decrease value dr.

However, if the CPU 30 judges that the shift of the automatic transmission from neutral to drive has been made, it switches to step 95 and determines various values based on the signal from the engine water temperature sensor 22 corresponding to the shift of the automatic transmission from neutral (N) to drive (D), such as the fuel increase compensation value Cdr(D), the initial fuel increase compensation value Cdr(ID), a fuel decrease value dr(D) by which the fuel increasing compensation value is subtracted, and the times t1 and t2 (see FIG. 7) for determining timings of increasing intake air and fuel, respectively.

After the calculation of these values, CPU 30 causes the timer T to count the time t2 down and compares the downcounted time of the timer T with the time t1 as the duration of time t in step 96. The CPU 30 judges, in step 97, whether the downcounted time, t2−t, has reached the time t1, in other words whether the fuel increase timing (TF) (shown in FIG. 7) is reached. These steps 96 and 97 are repeated until the downcounted time, t2−t, becomes equal to the time t1. When the fuel increase timing (TF) is reached, CPU 30 switches to step 98 to set the fuel increase compensation value (Cdr) to the initial value Gdr(ID) obtained in step 95.

In this way, when the automatic transmission shifts itself from the neutral (N) range to the drive (D) range, the increase of fuel is caused to precede the compensatory increase of intake air which is caused by the ISC valve 24 depending upon engine load. That is, whereas the compensatory increase of intake air by the ISC valve 24 is caused at the moment the engine is actually loaded resulting from the shift of the automatic transmission to the drive (D) range, nevertheless, the increase of fuel takes place at a timing (FT) which is a predetermined time earlier than the timing at which the compensatory increase of intake air takes place. Therefore, by the fuel injection system not increasingly injecting fuel in timely response to the compensatory increase of intake air by the ISC valve 24, but doing so earlier, the fuel mixture does not become lean and thereby prevents dropping of the speed of the engine when the automatic transmission is shifted from neutral (N) range to drive (D) range.

It is to be understood that whereas the invention has been described in detail with respect to a preferred embodiment thereof, nevertheless, various other embodiments and variants are possible which are within the spirit and scope of the invention, and such other embodiments and variants are intended to be covered by the following claims.

What is claimed is:

1. An engine control system for an internal combustion engine with an automatic transmission, said internal combustion engine having intake air control means for causing an increased quantity of intake air to be introduced into said internal combustion engine when said automatic transmission shifts from a neutral range to a drive range, said engine control system comprising:

inhibitor means for detecting when said automatic transmission is operating in neutral and drive ranges;

fuel increasing means for causing an increased quantity of fuel to be introduced into said internal combustion engine according to said increased quantity of intake air; and fuel injection control means for determining, based on signals from said inhibitor means, when said transmission has shifted from the neutral range to the drive range, and causing fuel injection at said increased quantity of fuel to begin at a timing prior to increasing the quantity of intake air when said automatic transmission shifts from the neutral range to the drive range.

2. An engine control system as defined in claim 1, wherein said timing is set depending upon a temperature which is related to engine operating conditions.

3. An engine control system as defined in claim 2, wherein said temperature is a temperature of a coolant for said internal combustion engine.

4. An engine control system as defined in claim 2, wherein said temperature is a temperature of an oil used in said automatic transmission.

5. An engine control system as defined in claim 2, wherein said timing is set for causing fuel injection at said increased quantity to begin earlier as said temperature decreases.

6. An engine control system as defined in claim 2, wherein said increased quantity of fuel is decreased as said temperature decreases.

7. An engine control system as defined in claim 2, wherein said increase quantity of intake air is decreased as said temperature decreases.

8. An engine control system as defined in claim 1, wherein said fuel injection control means is disabled when said internal combustion engine operates in a fuel cut zone.

* * * * *